United States Patent [19]
Roth

[11] 3,905,787
[45] Sept. 16, 1975

[54] FILTER

[75] Inventor: Fred S. Roth, Olivette, Mo.

[73] Assignee: Monsanto Company, St. Louis, Mo.

[22] Filed: Dec. 23, 1974

[21] Appl. No.: 535,327

[52] U.S. Cl. ............... 55/488; 55/518; 55/DIG. 31
[51] Int. Cl.² ........................................ B01D 25/02
[58] Field of Search ........................... 55/309–314,
  55/417, 420, 485–488, 518, 519, DIG. 31

[56] References Cited
UNITED STATES PATENTS

| | | | |
|---|---|---|---|
| 3,075,334 | 1/1963 | Nutting | 55/DIG. 31 |
| 3,400,520 | 9/1968 | Sakurai | 55/487 |
| 3,425,334 | 2/1969 | Brown et al. | 55/417 |
| 3,616,802 | 11/1971 | Marinaccio | 55/417 |

Primary Examiner—Bernard Nozick
Attorney, Agent, or Firm—Robert L. Broad, Jr.

[57] ABSTRACT

A filtering device wherein a nonwoven fabric is secured to a filter layer on the downstream side thereof for supporting the filter layer, the nonwoven fabric being provided with a plurality of intersecting slits which form flap valves which open to allow the passage of a gaseous medium through the device, the combined area of the flap valves being 35 to 60 percent of the area of the nonwoven fabric and the nonwoven fabric having a weight within the range of 13 to 34 grams per square meter. Preferably, the fabric has a weight of 13 to 20 grams per square meter and the total flap valve area is 40 to 50 percent of the area of the fabric.

4 Claims, 4 Drawing Figures

PATENTED SEP 16 1975

3,905,787

FILTER

BACKGROUND OF THE INVENTION a. Field of the Invention

This invention relates to devices for filtering particulate matter from a gaseous medium.

b. Description of the Prior Art

It is known to make a filter by sandwiching a glass fiber batt between a pair of perforated metal sheets and then positioning the sandwich in a frame to hold the parts together. Such a filter is commonly used to remove particulate matter from air used in heating and air conditioning systems. Such a filter has several disadvantages. First, it is relatively expensive in both material and assembly costs. Second, unless one is either very careful or wears gloves in installing or removing such a filter the edges of the perforations in the metal layers will inflict painful cuts on the fingers.

It is also known to make a cigarette filter by positioning a slitted paper downstream from a gaseous medium accelerator, as shown in U.S. Pat. No. 3,616,802. This filter is designed to trap tar-like materials which strike and adhere to the paper. It does not appear that this type of filter would be suitable for trapping dry particulate matter, which does not have the characteristics necessary for adherence to the paper.

SUMMARY OF THE INVENTION

This invention provides a filtering device wherein a nonwoven fabric layer is secured to the downstream surface of a filter layer for supporting the filter layer, the nonwoven fabric having therein a a plurality of intersecting slits forming flap valves through which a gaseous medium to be filtered may pass. The combined area of the flap valves forms 35 to 60 percent of the area of the nonwoven fabric and the nonwoven fabric has a weight within the range of 13 to 34 grams per square meter.

DETAILED DESCRIPTION OF THE INVENTION

Figure 1:
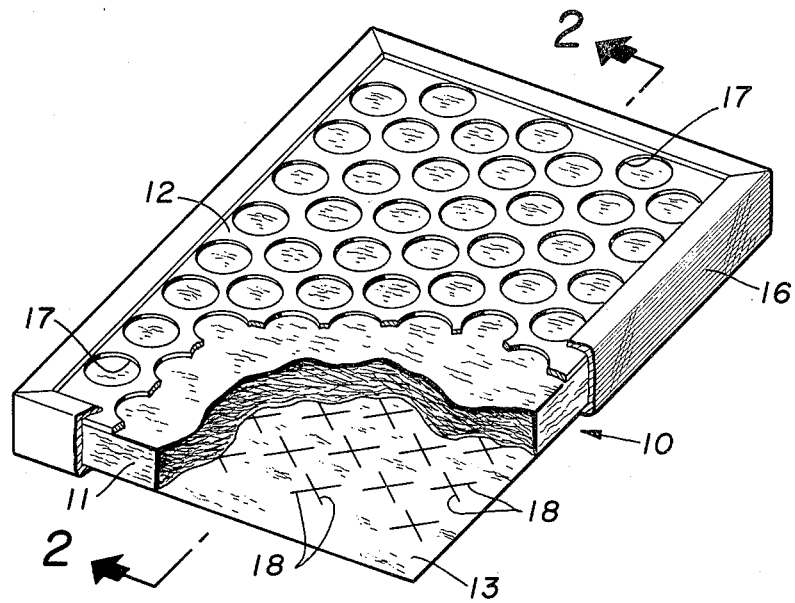
FIG. 1 is a perspective view of the filtering device of the present invention with a portion broken away to show the slits in the nonwoven fabric on the downstream side of the filtering device.

Referring now in detail to the drawings there is shown a filtering device 10 made up of a fiber glass batt 11 sandwiched between a perforated metal sheet 12 and a nonwoven fabric layer 13. A frame 16 of a conventional type extends around the periphery of the device 10 to hold the metal sheet 12 in place and to seal the edges of the device 10. The filtering device 10 is designed for passage of air or another gaseous medium through the device in the direction shown by the arrows in FIG. 2.

The metal sheet 12 is a conventional sheet used in making filters and is provided with circular apertures 17 having a combined area of approximately 80 percent of the area of the sheet 12. The layer 11 is a conventional glass fiber batting material commonly used in filters.

The nonwoven fabric layer 13 may be made by a process such as that described in U.S. Pat. No. 3,542,615. In this process a number of filaments are laid down in a layer on a moving belt which carries the layer of filaments through a zone where the filaments are treated to bond the individual filaments together to form a nonwoven fabric having a paper-like appearance. The fabric will of course be porous, with the porosity of the fabric being determined by the amount of filaments in the layer.

In the present invention the nonwoven fabric layer 13 is bonded to the batt 11 by a suitable adhesive. In the usual process for forming the batt 11, glass fibers are assembled to form a layer which is impregnated with a phenolic resin and then heated to cure the resin to secure contacting fibers in the batt 11 to each other. This is conventional. The nonwoven fabric layer 13 may be secured to the batt 11 in the same manner.

Figure 2:
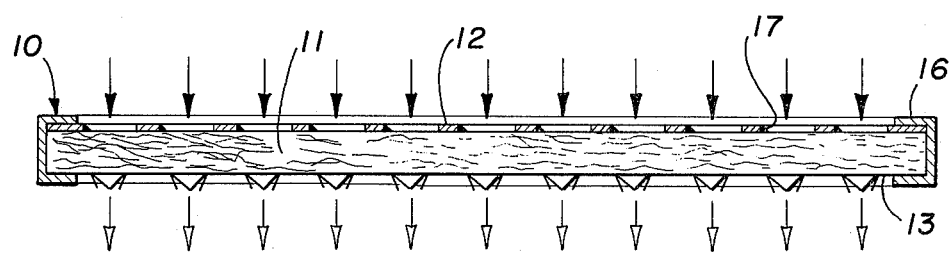
FIG. 2 is a cross-sectional view of the filtering device showing the positioning of the various elements making up the device.
Figure 3:
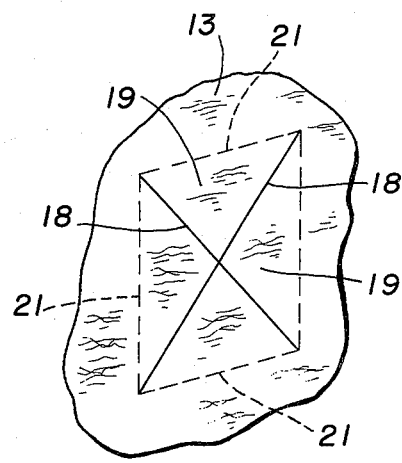
FIG. 3 is an enlarged fragmentary view showing the details of one of the flap valves in the nonwoven fabric layer in a closed position.

The nonwoven fabric layer 13 is provided with a plurality of intersecting slits which form flap valves 19. The fabric 13 is sufficiently flexible that when a gaseous medium is passed through the filtering device in the direction of the arrows shown in FIG. 2 the flap valves will open from the closed position shown in FIGS. 1 and 3 to the open position shown in FIGS. 2 and 4. When the valves 19 are closed, as shown in FIGS. 1 and 3, the face of the device 10 appears to be a continuous sheet and has a visually pleasing appearance. This is an advantage at the point of sale.

Figure 4:
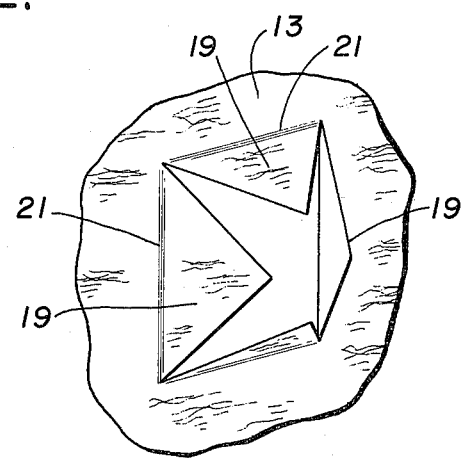
FIG. 4 is an enlarged fragmentary view showing one of the flap valves in an open position.

It has been found that the density of the nonwoven fabric 13 should be controlled within certain limits. Specifically, the fabric should have a weight of 13 to 34 grams per square meter with a preferred weight of 13 to 20 grams per square meter. If the weight of the fabric is below about 13 grams per square meter the fabric will not have sufficient strength to carry the load imposed by the pressure differential across the device. If the weight of the fabric is above about 34 grams per square meter, the fabric will have a stiffness such that the flap valves 19 will not readily open, as shown in FIG. 4, to allow the passage of the gaseous medium through the filtering device.

It has also been found that the combined area of the flap valves 19 should be about 35 to 60 percent of the total area of the nonwoven fabric layer 13, with a preferred range of 40 to 50 percent. The area of each flap valve is that area which is free to deflect from the plane of the layer 13 to allow the passage of the gaseous medium through the device 10. For example, the dotted lines 21 in FIG. 3 circumscribe the area of one group of the flap valves.

If the total area of the flap valves is less than about 35 percent of the total area of the fabric 13, the filter will be subject to premature blinding. Generally, a filter for use in a heating or air conditioning system is designed to trap only the larger particulate matter and to allow the finer particles to pass through the filter. If the area of the flap valves is below about 35 percent of the area of the fabric 13 too much of the finer particulate matter will be trapped by the filter with the result that the filter becomes completely clogged in such a short time that the filter is unacceptable. This is called "blinding".

If the area of the flap valves is above about 60 percent of the total area of the fabric layer 13, this layer may not have sufficient strength to withstand the load imposed by the pressure differential across the filter. The optimum range for the area of the flap valves is 40 to 50 percent of the area of the fabric 13. If the combined flap valve area is kept within this preferred range the filter will trap enough of the finer particles to provide excellent performance but on the other hand will not be subject to a short life brought about by premature blinding.

In operation, the filter device 10 is positioned in a duct or other passageway carrying a gaseous medium, such as air, to be filtered. The device 10 is positioned in the duct in such a manner that air passes through the device in the direction shown in FIG. 2. Under the pressure imposed by moving air the flap valves 19 will open as shown in FIGS. 2 and 4 to allow the air to pass through the device. It can readily be seen that the use of the fabric layer 13 substantially reduces the possibility of cut fingers at times of installation or removal of the device.

The porosity of the fabric layer 13 enhances the filtration efficiency of the device by trapping smaller particulate matter at points between the flap valves. Filtration efficiency with respect to larger particulate matter is also increased by virtue of the fact that much of the air entering the batt 11 must flow through the batt 11 diagonally to pass through one of the flap valves.

What is claimed is:

1. A filtering device, comprising
   a. a filter layer for removing particulate matter from a gaseous medium passed therethrough, and
   b. a layer of nonwoven fabric positioned in contact with the filter layer on the downstream side thereof for supporting said filter layer, said nonwoven fabric having therein a plurality of slits forming a plurality of flap valves, the combined area of said flap valves being 35 to 60 percent of the area of said nonwoven fabric.

2. The filtering device of claim 1 wherein the nonwoven fabric has a weight within the range of 13 to 34 grams per square meter.

3. The device of claim 1 wherein the combined area of said flap valves is 40 to 50 percent of the total area of said fabric.

4. A filtering device comprising
   a. a filter layer for removing particular matter from a gaseous medium passed therethrough, and
   b. a layer of porous nonwoven fabric bonded to the filter layer on the downstream side thereof, said nonwoven fabric having therein a plurality of intersecting slits forming a plurality of flap valves, the combined area of said flap valves being 40 to 50 percent of the area of the nonwoven fabric, said fabric having a weight of 13 to 20 grams per square meter.

* * * * *